United States Patent
Pate et al.

(10) Patent No.: US 10,206,043 B2
(45) Date of Patent: Feb. 12, 2019

(54) METHOD AND APPARATUS FOR AUDIO PASS-THROUGH

(71) Applicant: Fitbit, Inc., San Francisco, CA (US)

(72) Inventors: Michael Pate, Pleasanton, CA (US); Morgan Pate, Pleasanton, CA (US)

(73) Assignee: Fitbit, Inc., San Francisco, CA (US)

( * ) Notice: Subject to any disclaimer, the term of this patent is extended or adjusted under 35 U.S.C. 154(b) by 0 days.

(21) Appl. No.: 15/442,122

(22) Filed: Feb. 24, 2017

(65) Prior Publication Data

US 2018/0249250 A1 Aug. 30, 2018

(51) Int. Cl.
  G06F 3/16 (2006.01)
  H04R 5/04 (2006.01)
  H04S 7/00 (2006.01)

(52) U.S. Cl.
  CPC .............. H04R 5/04 (2013.01); G06F 3/165 (2013.01); H04S 7/303 (2013.01)

(58) Field of Classification Search
  None
  See application file for complete search history.

(56) References Cited

U.S. PATENT DOCUMENTS

| | | | | |
|---|---|---|---|---|
| 2008/0240458 A1* | 10/2008 | Goldstein | ............ | H04R 25/453 381/72 |
| 2008/0267416 A1* | 10/2008 | Goldstein | ............ | H04R 1/1091 381/56 |
| 2015/0222977 A1* | 8/2015 | Angel, Jr. | .............. | H04R 1/105 381/74 |
| 2016/0188284 A1* | 6/2016 | Lu | ............................ | H04R 5/04 381/74 |

* cited by examiner

Primary Examiner — Curtis A Kuntz
Assistant Examiner — Kenny H Truong
(74) Attorney, Agent, or Firm — Hogan Lovells US LLP (57) ABSTRACT

Methods and apparatuses for audio pass-through are disclosed. In one aspect, a method of operating a wearable audio device may involve receiving an ambient audio signal, detecting a first audio signal from within the received ambient audio signal, and determining that the first audio signal meets a first metric for pass-through to a user of the wearable audio device. The first metric may be indicative of a first priority level of the first audio signal to the user. The method may further involve isolating the first audio signal based on filtering the ambient audio signal in response to determining that the first audio signal meets the first metric and adjusting playback of the isolated first audio signal for the user via a speaker.

19 Claims, 10 Drawing Sheets

METHOD AND APPARATUS FOR AUDIO PASS-THROUGH

TECHNICAL FIELD

This disclosure relates to the field of wearable audio devices, and particularly to the pass-through of critical audio to a user of a wearable audio device.

BACKGROUND

Wearable audio devices, such as headphones, are generally portable audio playback devices through which a user can playback or listen to various audio signals. A user may utilize such a portable wearable audio device while travelling or moving through various different environments. Since a wearable audio device may play audio to the user, the audio playback may inhibit the user's ability to recognize and/or be aware of other audio signals from sources within an environment. Further, certain wearable audio devices may be designed to block out environmental audio signals, e.g., via passive and/or active "noise cancellation". Such blocking of audio signals may further reduce the user's ability to perceive audio signals from sources in the environment.

SUMMARY

The systems, methods and devices of this disclosure each have several innovative aspects, no single one of which is solely responsible for the desirable attributes disclosed herein.

In one aspect, there is provided a method operable by a wearable audio device, the wearable audio device comprising a speaker, a microphone, and a processor circuit. The method may involve: receiving an ambient audio signal from at least one of a local environment and a remote environment; detecting, using the processor circuit, a first audio signal from within the received ambient audio signal; and determining, using the processor circuit, that the first audio signal meets a first metric for pass-through to a user of the wearable audio device, the first metric indicative of a first priority level of the first audio signal to the user. The method may further involve: isolating, using the processor circuit, the first audio signal based on filtering the ambient audio signal in response to determining that the first audio signal meets the first metric; and adjusting playback of the isolated first audio signal for the user via the speaker.

In another aspect, there is provided a wearable device, including a speaker; a microphone; and a processor circuit. The wearable device may further include a memory having stored thereon instruction that, when executed, cause the processor to: receive, from the microphone, an ambient audio signal; detect a first audio signal from within the received ambient audio signal; determine that the first audio signal meets a first metric for pass-through to a user of the wearable audio device, the first metric indicative of a first priority level of the first audio signal to the user; filter the ambient audio signal to isolate the first audio signal in response to determining that the audio signal meets the first metric; and play the isolated first audio signal via the speaker.

In yet another aspect, there is provided a wearable audio device, including at least one speaker; a microphone; a motion sensor; and a processor circuit. The wearable audio device may further include a memory having stored thereon instruction that, when executed, cause the processor to: receive, from the microphone, an ambient audio signal; detect an audio signal from within the received ambient audio signal; calculate a direction from the wearable audio device to a source of the audio signal; detect, based on output from the motion sensor, that a user has adjusted the positioning of the user's head toward the direction of the source of the audio signal; filter the ambient audio signal to isolate the audio signal in response to detecting that the user has adjusted the positioning of the user's head toward the direction of the source; and play the isolated audio signal via the speaker.

DETAILED DESCRIPTION

Wearable audio devices may obstruct a user's ability to hear signals other sources of audio from the environment. Moreover, certain wearable device may be designed to reduce or substantially eliminate ambient environmental audio signals in order to improve the user's listening experience by preventing the environmental audio signals from interfering with the audio playback on the wearable audio device. Such wearable audio device may be termed "noise cancelling headphones".

Noise cancellation may generally be divided into "passive" and "active" techniques, which may be used in combination to reduce the influence of environmental noise. Passive noise cancellation may attenuate external audio sources by physically isolating the user's ears from the environment. This may be accomplished, for example, by the placement of a material which surrounds or is inserted into the user's ears (depending on the style of wearable audio device) in order to prevent audio signals from directly travelling through the air into the user's ears. Active noise cancellation may attenuate external audio source, for example, by producing an audio signal that is substantially out of phase with the external audio source to cancel the external audio source via destructive interference. Noise cancellation wearable audio devices may incorporate combinations of active and passive noise cancellation techniques.

Noise cancellation headphones may improve the isolation of the listener from the outside world, but this comes at the cost of removing the user's attention from potentially important audible cues or audio sources. This disclosure relates to an intelligent protocol to determine if and when an audio source should be brought to the attention of the user. Sources which may be desirable to bring to the user's attention can range from local sources, such as, for example, noises, bicycle bells, and/or a particular voice speaking directly to the user, to remote sources, such as, for example, baby monitors located in other rooms, songs played on other media sources, smart door alarms, package delivery dial-ins from call boxes, etc.

Depending on the environment in which a user is using a wearable audio device, it may be undesirable or even dangerous for certain audio signals to be attenuated or suppressed such that the user cannot hear the sounds. For example, a user may be walking down a street and a bicyclist may ring a bell in order to alert the user of the presence of the bicyclist. Attenuation of this bell signal may result in the user being unaware of the presence of the bicyclist, increasing the chance of a collision between the user and the bicyclist.

Certain techniques for allowing environmental audio signals have been developed to address this issue. For example, noise cancellation features may be designed to cancel only a portion of the environmental audio, letting a portion through to the user such that the user can perceive certain audio signals from the environment. The level of audio pass-through may be selectable by the user, enabling the user to increase audio pass-through when appropriate. However, there techniques typically let in all environmental audio, thereby reducing the benefits of noise cancellation (e.g., improved listening experience due to lack of distractions).

Accordingly, one aspect of this disclosure relates to the pass-through of environmental audio that is critical and/or desirable to the user which preventing other audio sources from being passed to the user. As is described in detail below, critical and/or desirable audio signals may be audio signals which meet certain metrics, criteria, or requirements for pass-through to the user of the wearable device.

Another aspect of this disclosure relates to the pass-through of remote audio sources to the user. For example, the user may wish to receive or be informed of certain audio signals generated in remote areas while using a wearable audio device. For example, a user may wish to be alerted to an audio signal received or generated by a baby monitor to have the audio signal passed-through to the user of the wearable audio device. For example, this may enable the user to monitor the audio signal picked-up by the baby monitor while using the wearable audio device for playback of other audio signals.

Wearable Audio Device Overview

Figure 1A:
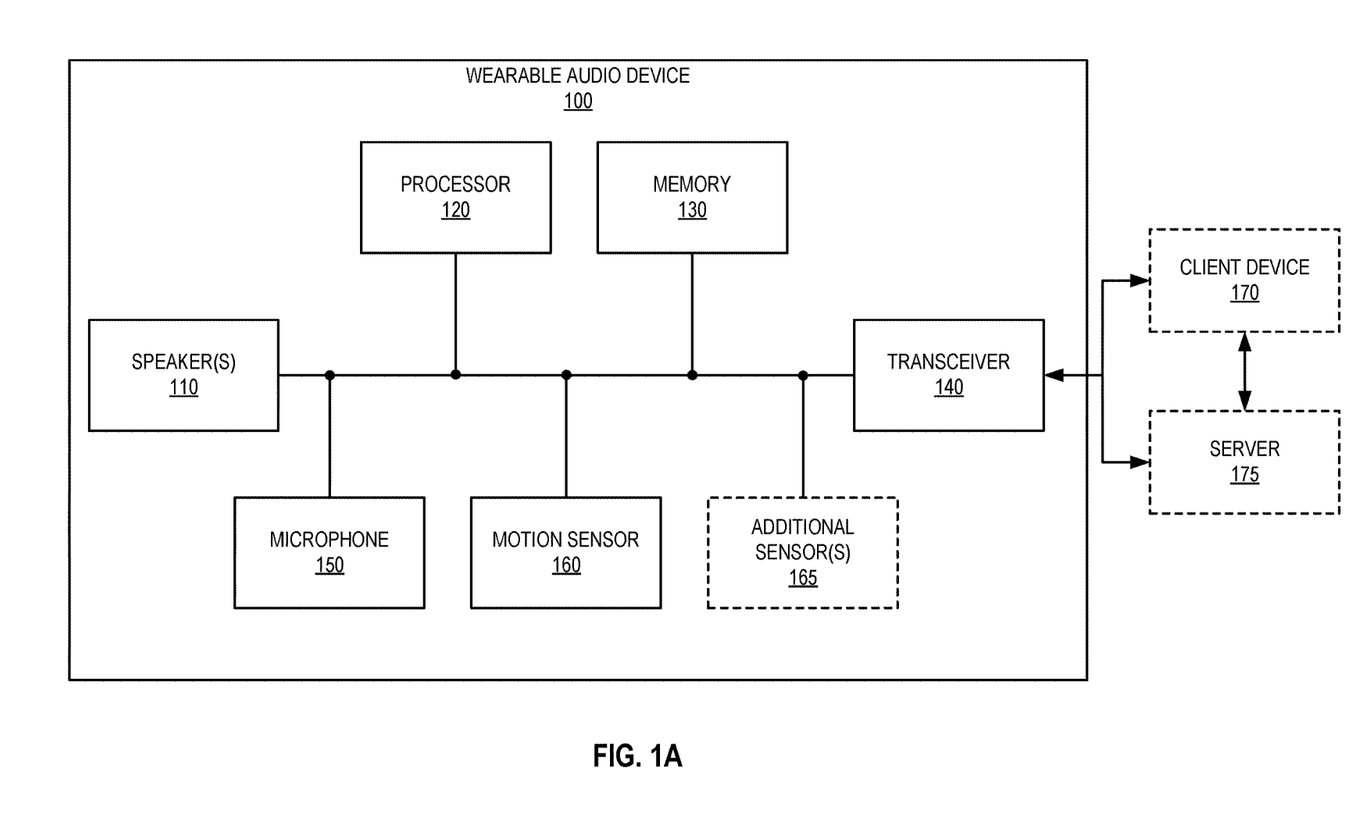
FIG. 1A is a block diagram illustrating certain components of an example wearable audio device in accordance with aspect(s) of this disclosure.

FIG. 1A is a block diagram illustrating certain components of an example wearable audio device in accordance with aspect(s) of this disclosure. As shown in FIG. 1A, the wearable audio device 100 may include one or more speaker(s) 110, a processor (or processor circuit) 120, a memory (or memory circuit) 130, a transceiver 140, a microphone, 150, a motion sensor 160, and optional additional sensors 165. In other embodiments, the wearable audio device 100 may include additional components and/or include a subset of the illustrated components. The wearable audio device 100 may further be in communication with external devices, such as client device 170 and/or a server 175.

In one implementation, the wearable audio device 100 may include one or more speakers, such as a pair of speakers 110, each configured to supply a right or left audio signal to a corresponding one of a user's ears. The speakers 110 may be designed to be placed over and/or inserted into the user's ears to provide audio signals thereto. The processor 120 may be configured to transcode an audio signal into a format (e.g., an analog format) to be applied to the speakers 110. Alternatively, the speakers 110 may directly receive an audio signal for playback from the transceiver 140 or the speakers 110 may include one or more dedicated processors (not illustrated) for transcoding audio signals for playback.

The memory 130 may store executable instructions for causing the processor 120 to perform one or more techniques in accordance with this disclosure. Additionally, in certain implementations, the memory 130 may also store audio signals for playback via the speakers 110. The transceiver 140 may be configured to receive signals from external devices, such as the client device 170 and/or the server 175. The client device 170 may include, for example, a wearable electronic device (e.g., a biometric monitoring or activity tracking device), a mobile phone, a music/media player (e.g., a portable music player), a camera, a weight scale, etc. Depending on the implementation, the client device 170 may be any device capable of communicating with the wearable audio device 100. The transceiver 140 may be configured to communicate with the external device(s) wirelessly and/or via one or more wired connections. The microphone 150 of the wearable device may be configured to receive audio signals from the environment, which may be processed by the processor 120. The microphone may also be used as an input device for receiving audio commands from the user of the wearable audio device. In certain implementations, the audio signals received by the microphone 150 may also be used by the processor 120 for active noise cancellation.

In order to implement active noise cancellation, the processor 120 may generate an audio signal designed to destructively interfere with the ambient audio signal, which may be received by the microphone 150. The generated noise cancellation audio signal may be played by the speakers 110 used for audio playback to the user or may be played by dedicated speakers 110 in addition to those speakers used for playback of audio to the user. Finally, the motion sensor 160 may be used to detect the movement of the user's head, which may be used to receive input from the user. The additional sensors 165 may be sensors used to receive input from a user (e.g., a touch input sensor) or sensor used to track physiological metric(s) of the user (e.g., a heart rate sensor). Examples of the additional sensors 165 include: a button, a pressure sensor, a touch input sensor, a heart rate sensor, other physiological sensor, etc.

Figure 1B:
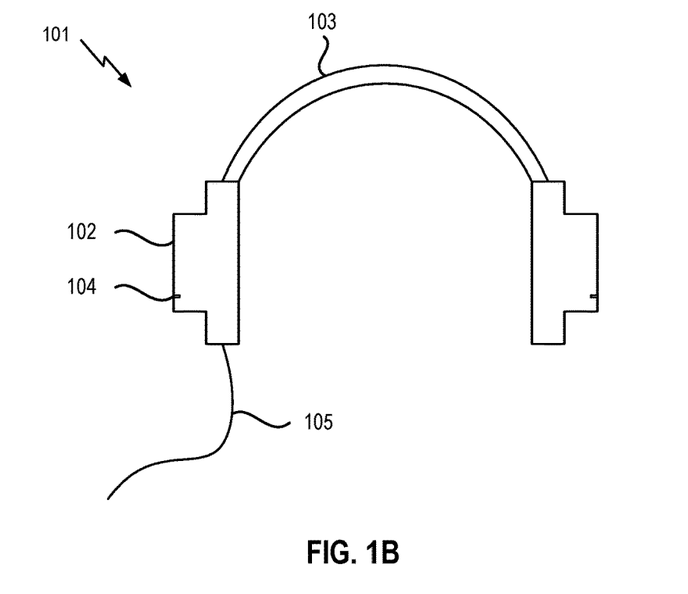
FIG. 1B is a diagram illustrating an example embodiment of a wearable audio device in accordance with aspect(s) of this disclosure.
Figure 1C:
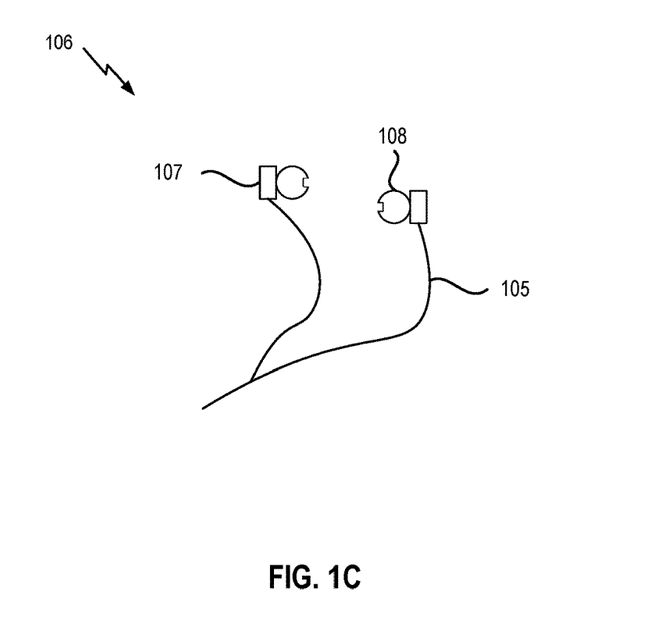
FIG. 1C is a diagram illustrating another example embodiment of a wearable audio device in accordance with aspect(s) of this disclosure.

FIG. 1B is a diagram illustrating an example embodiment of a wearable audio device in accordance with aspect(s) of this disclosure. FIG. 1C is a diagram illustrating another example embodiment of a wearable audio device in accordance with aspect(s) of this disclosure. FIG. 1B illustrates a wearable audio device 101 that is worn over and fully cover a user's ears (e.g., over-the-ear headphones). Alternatively, the headphones 101 may be on-ear headphones that rest over the user's ears without fully covering the ears. The headphones 102 may include ear-cups 102, designed to cover or rest on a user's ears and a head-strap connecting the ear-cups 102 and designed maintaining the positioning of the ear-cups on the user's ears. The headphones 101 may also include one or more microphone slots 104 designed to allow the ambient environmental audio signals to penetrate the housing of the ear-cups 102 to reach a microphone formed therein. The headphones 101 may also include a wire 105 designed to be connected to an audio source. Alternatively, the headphones 101 may be wireless and may optionally not include the wire 105.

In the example of FIG. 1C, the wearable audio device is embodied by a pair of earphones (or earbuds) 106. The earphones 106 may include a body 107 on which a pair of deformable ear plugs 108 are arraigned. The ear plugs 108 are designed to be placed inside a user's ears and may provide passive noise reduction by filling the space within the user's ears. The body 107 of each ear plug 108 is connected by a wire 105, which can be connected to an audio source. Alternatively, the earbuds 106 may be wireless and either connected by a band (not shown) or formed separately. One or more feature(s) of the wearable audio device 100 of FIG. 1A may be incorporated into the device 101 of FIG. 1B and the device 106 of FIG. 1C.

Figure 2:
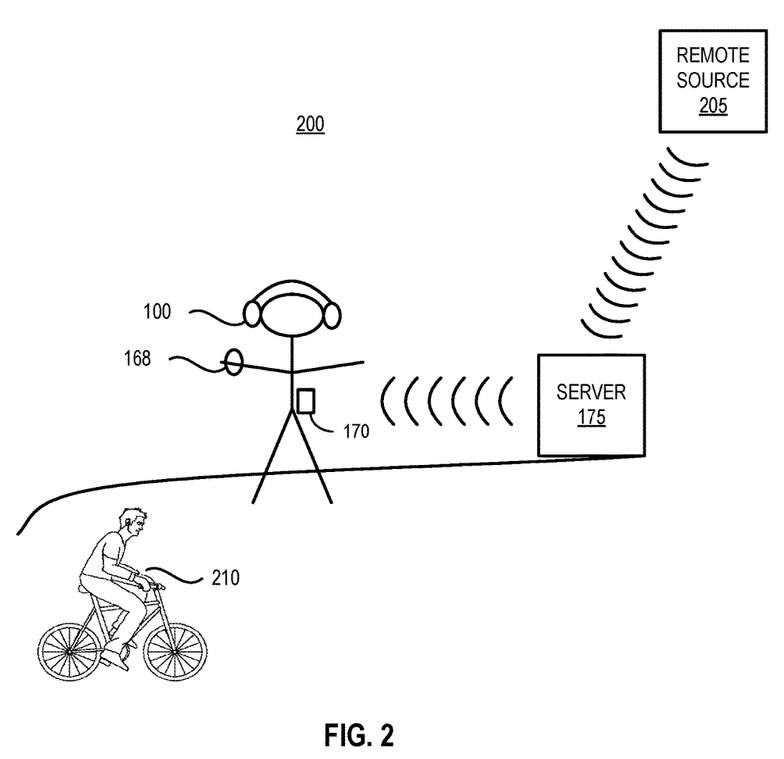
FIG. 2 is a block diagram illustrating an example environment in which a wearable device may be used in accordance with aspect(s) of this disclosure.

FIG. 2 is a block diagram illustrating an example environment in which a wearable device may be used in accordance with aspect(s) of this disclosure. The illustrated environment 200 of FIG. 2 includes a user wearing a wearable audio device 100 (e.g., over-the-ear headphones), a biometric monitoring device 168, a client device 170 carried by the user, a server 175 in communication with the client device 170, the biometric monitoring device 168, and/or the wearable audio device 100, as well as a remote source 205 and a local source 210. The local source 210 may comprise, for example, a bicycle bell 210 that emits an audio signal, which is passed-through to the user. The remote source 205 may be in communication directly and/or indirectly with any combination of the wearable audio device 100, the biometric monitoring device 168, the client device 170, and the server 175.

In the embodiment of FIG. 2, the wearable audio device 100 may be configured to playback a remote audio signal received from the remote source 205. This remote audio signal may be played back over a currently played back audio signal (e.g., with or without lowering the volume of the current audio signal) or may be played back while muting the current audio signal. In addition or alternatively, the user may be prompted by one or more of the wearable audio device 100, the biometric monitoring device 168, and the client device 170 to accept or reject playback of the audio signal from the remote source 205. The user may input his/her selection to accept or reject playback via one or more of: no response to the prompt; an audible (e.g., voice) response to the prompt; a movement of the user's head; a touch input, manually ending playback of a current audio signal; removing the wearable audio device from at least one of the user's ears; bodily movement or gesture; etc. The user input may be received directly by the wearable audio device 100 (e.g., via the microphone 150 and/or the motion sensor 160), by the biometric monitoring device 168, and/or by the client device 170.

Example Implementations of External Audio Signal Pass-Through

Figure 3:
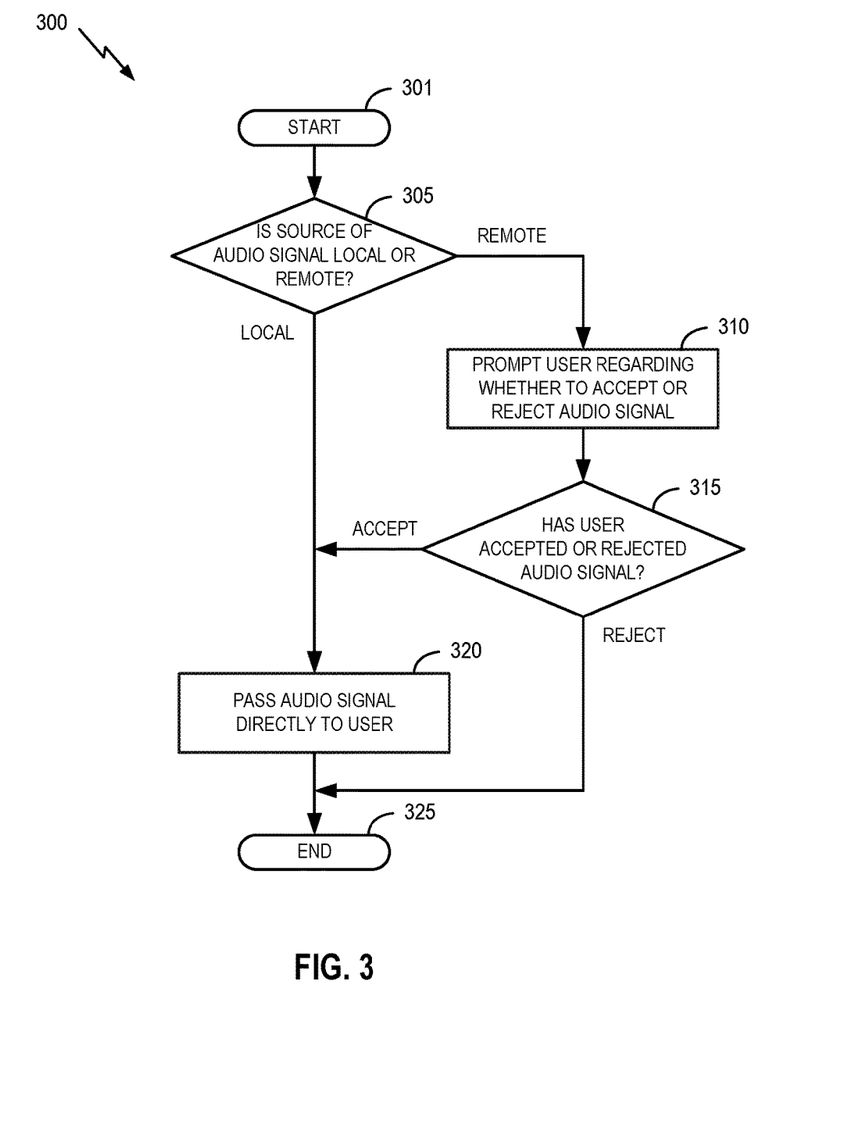
FIG. 3 is a flowchart illustrating an example method for the playback of environmental audio signals in accordance with aspect(s) of this disclosure.

An example technique for the playback of local and/or remote environmental audio signals will be described in connection with FIG. 3. FIG. 3 is a flowchart illustrating a method for the playback of environmental audio signals in accordance with aspect(s) of this disclosure. The example method of FIG. 3 may be operable by a wearable audio device 100, or component(s) thereof, for the pass-through or rejection of local and/or remote environmental audio signals to a user in accordance with aspect(s) of this disclosure. For example, the steps of method 300 illustrated in FIG. 3 may be performed by a processor 120 of the wearable audio device 100. In another example, a client device 170 (e.g., a mobile phone or wearable device), a server 175, or a remote source 205 in communication with the wearable audio device 100 may perform at least some of the steps of the method 300. For convenience, the method 300 is described as performed by the processor 120 of the wearable audio device 100.

The method 300 begins at block 301. At block 305, the processor 120 determines whether a source of a detected audio signal is local or remote. In one implementation, the processor 120 may determine whether the source of the audio signal is local or remote based on component or device from which the processor 120 receives the audio signal. For example, the audio signal may be received by the microphone 150, thereby indicating that the source of the audio signal is local. Alternatively, the audio signal may be received from a remote source 205 indicating that the source of the audio signal is remote. In response to the source being local, the method 300 continues at block 320. In response to the source being remote, the method 300 continues at block 310, at which the processor 120 prompts the user to either accept or reject the audio signal. At block 315, the processor 120 receives user input (or a lack of user input) indicating to either accept (continuing at block 320) or reject (continuing at block 325) playback of the audio signal. At block 320, the processor 120 passes the audio signal directly to the user via the speaker(s) 110.

When the source of the audio signal is remote, the remote source 205 may record the remote audio signal and pass information regarding the audio signal to the wearable audio device 100 and/or a remote processing hub (e.g., server 175). The remote source 205 may either stream all information for processing at the wearable audio device 100 and/or the server 175 or perform a portion of the processing of the audio signal at the remote source 205. The wearable device 100 may be connected to an ad-hoc network of devices including a remote source 205 and/or a server 175 which may be connected via wired connections and/or wireless network(s).

In certain embodiments, the processor 120 may provide the user with an alert rather than or in addition to passing the audio signal to the user. Examples of the alert may include visual, haptic, and/or audio cues which may be provided to the user through the speaker(s) 110 or additional sensor(s) 165 or may be provided to the user via the client device 170. The method 300 ends at block 325.

Figure 4:
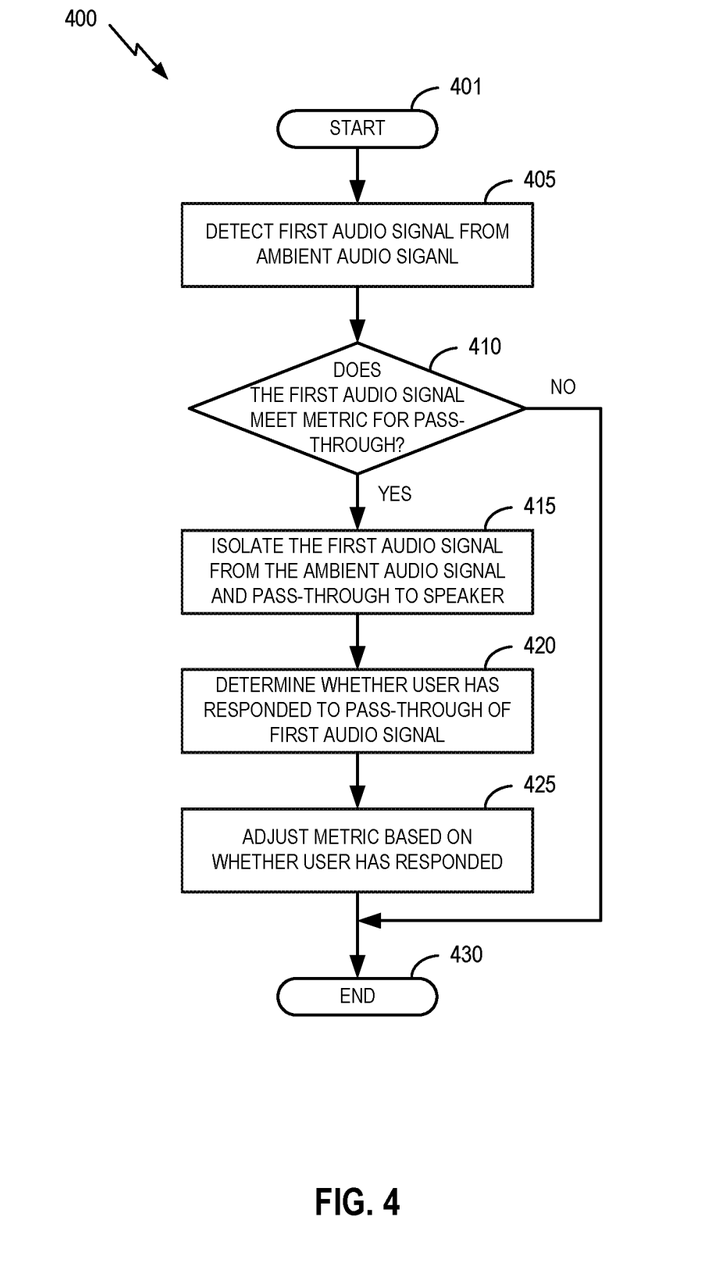
FIG. 4 is a flowchart illustrating another example method for the pass-through of audio signals to a wearable audio device in accordance with aspect(s) of this disclosure.

Another example technique for the pass-through of audio signals is illustrated in FIG. 4. FIG. 4 is a flowchart illustrating a method for the pass-through of audio signals to a wearable audio device in accordance with aspect(s) of this disclosure. The example method of FIG. 4 may be operable by a wearable audio device 100, or component(s) thereof, for the pass-through or rejection of local and/or remote environmental audio signals to a user in accordance with aspect(s) of this disclosure. For example, the steps of method 400 illustrated in FIG. 4 may be performed by a processor 120 of the wearable audio device 100. In another example, a client device 170, a server 175, or a remote source 205 in communication with the wearable audio device 100 may perform at least some of the steps of the method 400. For convenience, the method 400 is described as performed by the processor 120 of the wearable audio device 100.

The method 400 begins at block 401. At block 405, the processor 120 detects the presence of a first audio signal from an ambient audio signal. The detection of the first audio signal may be performed by any technique, such as via the use of frequency analysis and/or loudness monitoring. For example, the processor 120 may detect that that ambient audio signal has increased to a volume that is greater than a threshold volume. Alternatively or in addition, the processor 120 may match the frequency profile of the detected ambient audio signal to predefines frequency profiles of known audio sources. The processor 120 may also determine a type of a source of the audio signal via the use of a classification heuristic and/or neural network. The audio classifier may be self-learning in that the classifier may improve the identification of the types of audio sources based on previously identified audio source types.

At block 410, the processor 120 determines whether the first audio signal meets a metric, criterion, or requirement for pass-through to a user of the wearable audio device 100. The metric may be any one or more conditions for pass-through and may be based on characteristics of the first audio signal derived and/or received by the processor 120. For example, the metric for pass-through may be based on one or more of: a source of the first audio signal (e.g., a remote audio device, a person registered with the wearable audio device 100, a remote source 205, etc.), a volume of the first audio signal, a frequency of the first audio signal, a keyword within the first audio signal (e.g., the first audio signal including a voice calling the name of the user), etc. The metric may be indicative of a priority level for the pass-through of the corresponding audio signal to the user. For example, certain audio signals may have high pass-through priority as compared to other audio signals, and the priority levels may be automatically determined by the processor 120 and/or selected by the user.

In certain implementations, the processor 120 may determine whether the first audio signal meets the metric for pass-through based on the identified type of the audio source. For example, the first audio signal may meet the metric when the type of the audio source is identified as at least one of: a siren, a bicycle bell, a vehicle horn, a person's voice registered with the wearable audio device, a voice having a volume above a threshold level, and a voice saying the user's name. When the first audio signal meets the metric, the method 400 continues at block 415 and when the first audio signal does not meet the metric, the method 400 continues at block 430.

At block 415, the processor 120 isolates the first audio signal from the ambient audio signal and passes the isolated first audio signal through a speaker 110 of the wearable audio device 100 to the user. The processor 120 may isolate the first audio signal e.g., via filtering frequencies in the ambient audio signal other than the first audio signal from the received ambient audio signal. For example, a second audio signal may be present in the ambient audio signal and the second audio signal may not meet the pass-through metric. As such, the processor 120 may filter the second audio signal from the ambient audio signal prior to pass-through to the user. Pass-through (e.g., playback) of the first audio signal to the user may include adjusting playback of the first audio signal via altering at least one of the first audio signal and/or the currently played back audio signal. For example, if the first audio signal is above a first threshold volume or below a second threshold volume, the processor 120 may adjust the volume of the first audio signal to a level that is between the first and second threshold volumes, which may make the first audio signal easier for the user to hear. In one implementation, the processor 120 may reduce the volume of the currently played back audio signal so that it does not interfere with playback of the first audio signal.

At block 420, the processor 120 may determine whether the user has responded to the pass-through (e.g., playback) of the first audio signal. For example, the processor 120 may determine whether the output from one or more of the microphone 150, the motion sensor 160, and the additional sensor(s) 165 changes in response to the pass-through of the first audio signal. The user may provide feedback (e.g., the response) to the processor 120 via at least one of: a button, a client device 170, a microphone 150, a motion sensor 160, another physiological sensor, and a pressure sensor. In related aspects, the motion sensor 160 may comprises a multi-axis inertial-measurement unit (IMU). For example, the 3-axis IMU may be an accelerometer, the 6-axis IMU may be a combination of an accelerometer and a gyroscope, and the 9-axis IMU may be a combination of an accelerometer, a gyroscope, and a magnetometer.

In one implementation, the processor 120 may determine, based on output from the motion sensor 160, the manner in which the user has moved in response to the first audio signal being played via the speaker 110. In one implementation, the processor 120 may determine that the user has responded to the pass-through of the first audio signal in response to the user adjusting the position of his/her head by greater than a threshold movement value.

For example, the user may adjust the position of the user's head in response to the playback of the first audio signal, which may be detected by the motion sensor 160. In another example, the first audio signal may include the voice of a person attempting to communicate with the user. In this situation, the user may respond vocally, which may be detected by the microphone 150. In yet another implementation, the user may manually input a response to the first audio signal via one or more of the additional sensor(s), e.g., via touch input. The other situations, the user may not respond to the playback of the first audio signal.

At block 425, the processor 120 may adjust the metric based on whether the user responded to the pass-through of the first audio signal in block 420. For example, when the user responds to the pass-through of the first audio signal, the response from the user may be interpreted as a confirmation that the first audio signal is a type of audio signal that the user wishes to have passed-through. Thus, the processor 120 may adjust the metric such that audio signals similar to the first audio signal more easily meet the metric. When the user has not responded to the pass-through of the first audio signal, the processor 120 may infer that the user does not with for audio signals similar to the first audio signal to be passed-through, and thus, the processor 120 may adjust the metric such that audio signal similar to the first audio signal do not meet the metric as easily. The method 400 ends at block 430.

In the alternative, or in addition to the automatic adjustment of the metric, the wearable audio device 100 may provide the user with settings for adjusting, either directly or indirectly, the metric for pass-through to the user. For example, when in a setting where the user would like to focus his/her attention, such as a work environment, the settings may enable the user to block a larger portion of local and/or remote audio sources from being passed-through. Alternatively, in situations where the user would like to be connected to the ambient audio of their environment but use the wearable audio device to provide background music, e.g., when hiking outdoors, the settings may enable the user to allow a larger portion of local and/or remote audio sources to be passed-through.

Figure 5:
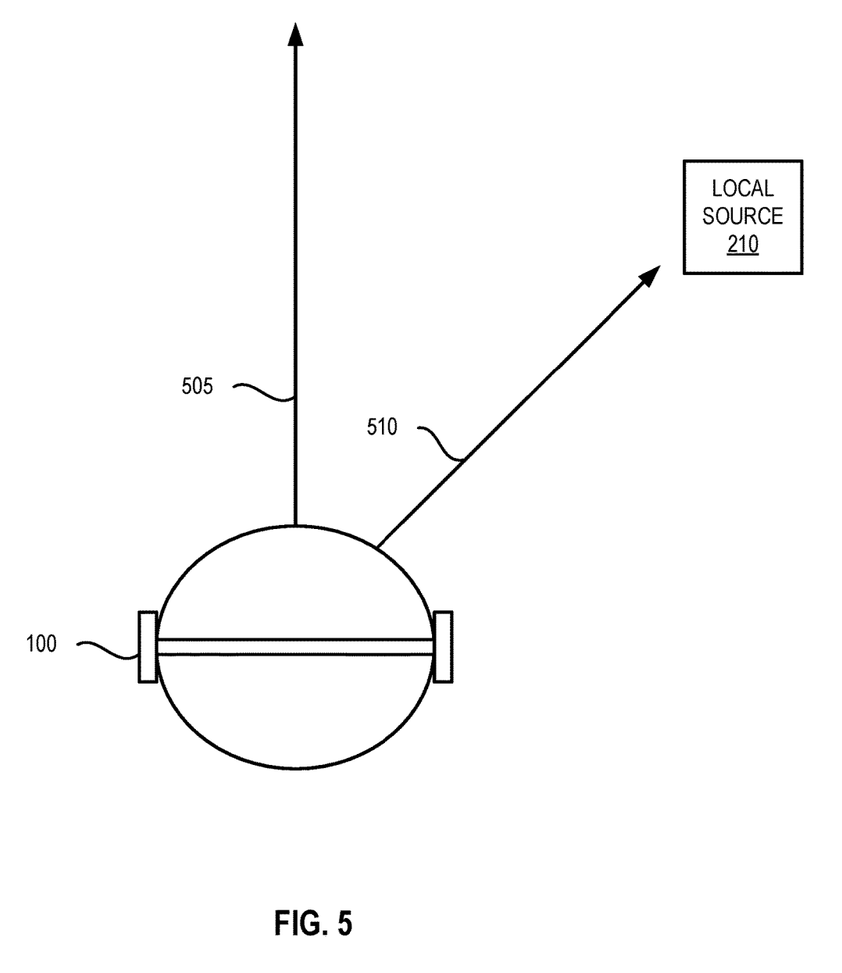
FIG. 5 is a diagram illustrating an example user response to the pass-through of an audio signal in accordance with aspect(s) of this disclosure.

FIG. 5 is a diagram illustrating an example user response to the pass-through of an audio signal in accordance with aspect(s) of this disclosure. In the embodiment of FIG. 5, a local source 210 may generate an audio signal that is passed-through to a user of the wearable audio device 100. As previously described, the local source 210 may produce any audio signal that the user may wish to hear, for example, the local source 210 may be at least one of: a siren, a bicycle bell, a vehicle horn, a person's voice registered with the wearable audio device, a voice having a volume above a threshold level, and a voice saying the user's name. The memory (e.g., memory 130) of the wearable audio device 100 may store a metric for one or more of the sources such that an audio signal from a given source may be passed-through to the user when meeting a corresponding metric.

As shown in FIG. 5, the user may have his/her head positioned toward a first direction 505 while using the wearable audio device 100. The local source 210 may emit an audio signal, which is passed-through to the user. Since the wearable audio device 100 may have a microphone 150 located in each of the ear-cups 102 (see FIG. 1B), the processor (e.g., processor 120) of the wearable audio device 100 may be able to calculate a direction 510 from which the audio signal is received (e.g., a direction from the wearable audio device 100 to the local source 210) based on, for example, one or more of a difference in volume between the two signals respectively received by the two microphones 105, a change in phase between the two signals, a difference in timing of receiving the two signals, etc. Based on the calculated direction 510, the processor 510 may play the audio signal via the speakers via generating a three-dimensional (3-D) audio effect that the played audio signal is emanating from the calculated direction 510. In some implementations, the processor 120 may further calculate a distance between the wearable audio device 100 and the local source 205 and the processor 205 may play the audio signal via generating the 3-D audio effect that the played audio signal is emanating from a point in a 3-D space corresponding to the local source 205. In certain implementations, the processor 120 may also determine whether the audio signal meets a metric for pass-through (see, e.g., block 410 of FIG. 4) based on the distance between the wearable audio device 100 and the local source 210. For example, local source(s) 210 within a threshold distance from the wearable audio device 100 may be more likely to meet the metric.

In response to the playback of the audio signal, the user may adjust the position of the user's head toward the local source 210. For example, the user may look in the direction 510 toward the local source 210. In one implementation, the output from the motion sensor 150 of the wearable audio device 100 may be indicative of such a change in the position of the user's head. Thus, the processor 120 may determine whether the user has adjusted the position of his/her head based on the output of the motion sensor 150 and the processor 120 may use the change in head position or lack thereof to determine whether the user has responded to pass-through of the audio signal (see, e.g., block 420 of FIG. 4).

Figure 6:
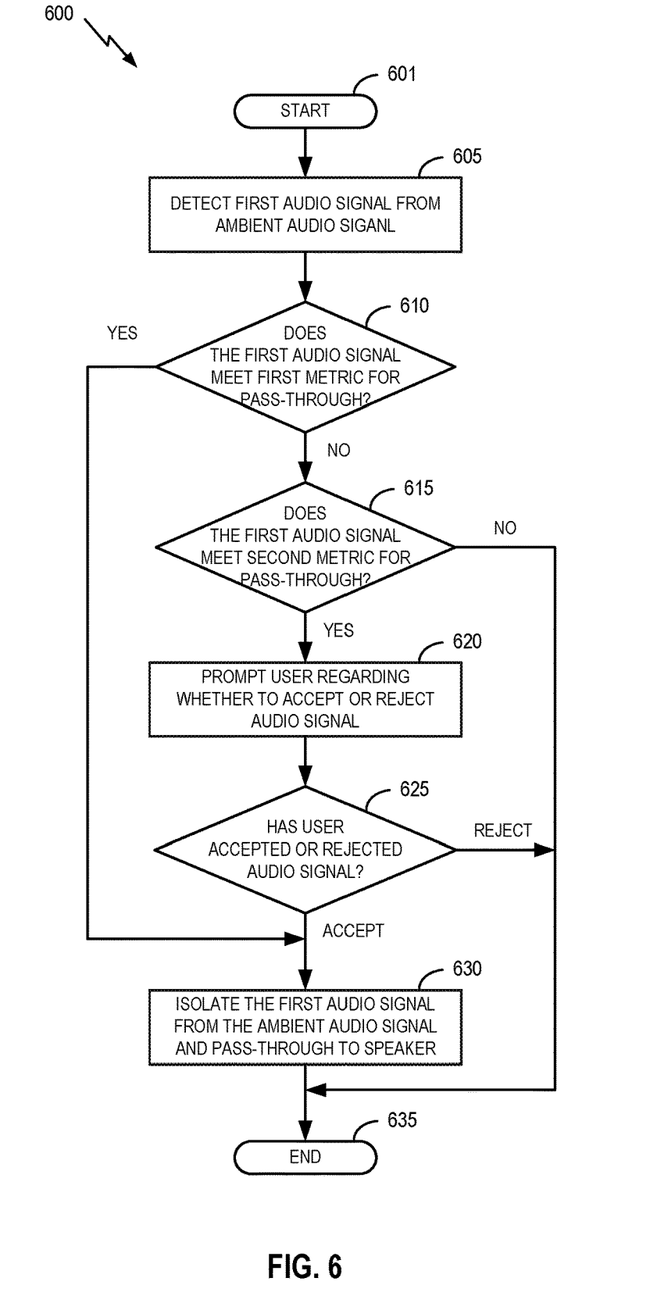
FIG. 6 is a flowchart illustrating an example method for the pass-through of audio signals to a wearable audio device in accordance with aspect(s) of this disclosure.

FIG. 6 is a flowchart illustrating another method for the pass-through of audio signals to a wearable audio device in accordance with aspect(s) of this disclosure. The example method of FIG. 6 may be operable by a wearable audio device 100, or component(s) thereof, for the pass-through or rejection of local and/or remote environmental audio signals to a user in accordance with aspect(s) of this disclosure. For example, the steps of method 600 illustrated in FIG. 6 may be performed by a processor 120 of the wearable audio device 100. In another example, a client device 170, a server 175, or a remote source 205 in communication with the wearable audio device 100 may perform at least some of the steps of the method 600. For convenience, the method 600 is described as performed by the processor 120 of the wearable audio device 100.

The method 600 begins at block 601. At block 605, the processor 120 detects a first audio signal from an ambient audio signal. The detection of the first audio signal may be similar to the processes described in connection with block 405 of FIG. 4, discussed above. At block 610, the processor 120 determines whether the first audio signal meets a first metric for pass-through to a user of the wearable audio device 100. When the first audio signal meets the first metric, the method 600 continues at block 630 and when the first audio signal does not meet the first metric, the method 600 continues at block 615. At block 615, the processor 120 determines whether the first audio signal meets a second metric for pass-through to a user of the wearable audio device 100. The second metric may has a lower threshold for pass-through than the first metric, e.g., the second metric may be indicative of a second priority level that is lower than a first priority level of the first metric. When the first audio signal meets the second metric, the method 600 continues at block 620 and when the first audio signal does not meet the second metric, the method 600 continues at block 635.

At block 620, the processor 120 prompts the user to either accept or reject the audio signal. At block 625, the processor 120 receives user input (or a lack of user input) indicating to either accept (continuing at block 630) or reject (continuing at block 635) playback of the audio signal. At block 630, the processor 120 isolates the first audio signal from the ambient audio signal and passes the isolated first audio signal through to the user via the speaker(s) 110. The method 600 ends at block 635.

The use of two metrics as described above in method 600 may have certain advantages over the use of one metric. For example, when the first audio signal meets the first metric, the processor 120 may have a certain level of confidence that the user wishes to receive playback of the first audio signal, and thus, does not need to request user input prior to playback. Similarly, when the first audio signal does not meet the second metric, the processor 120 may have a certain level of confidence that the user does not wish to receive playback of the first audio signal, and thus, does not need to request user input regarding playback of the first audio signal. However, for a first audio signal that does not meet the first metric but does meet the second metric, the processor 120 may not have sufficient confidence to pass-through the first audio signal. Thus, the processor 120 can request user input prior to passing the first audio signal to the user, so that the user is not interrupted by the sudden playback of signals which the user may or may not wish to hear.

Figure 7:
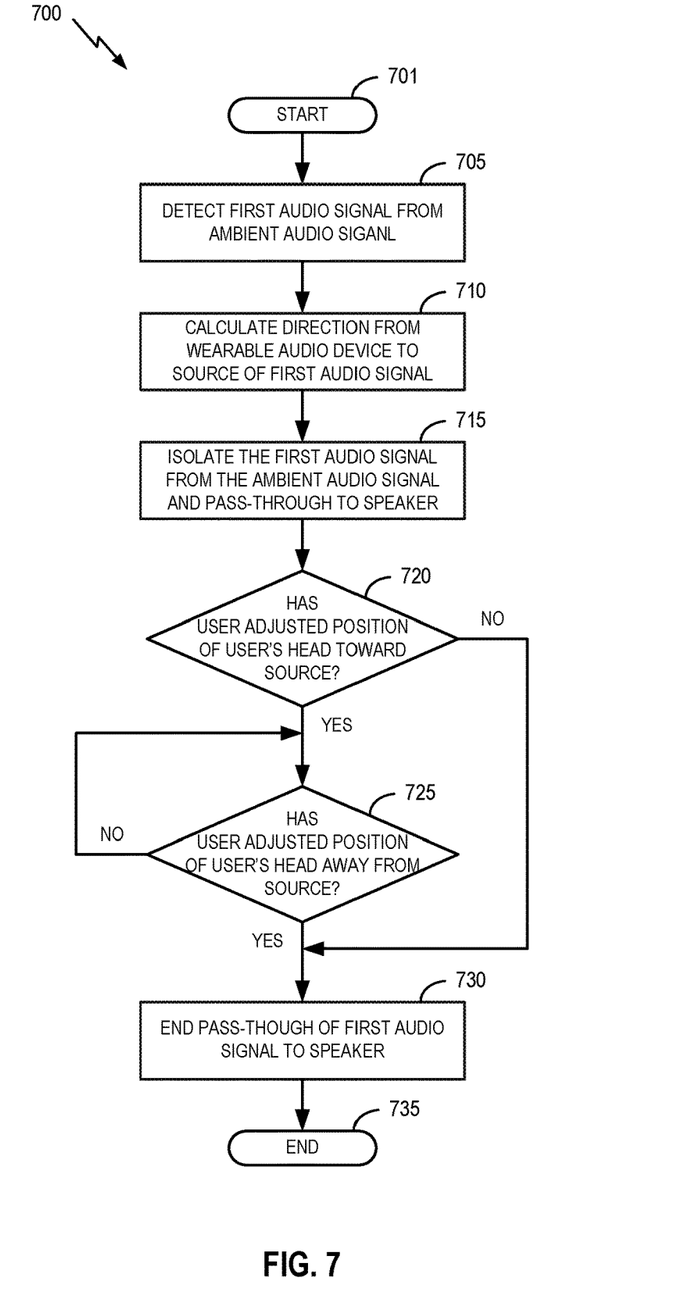
FIG. 7 is a flowchart illustrating another example method for the pass-through of audio signals to a wearable audio device in accordance with aspect(s) of this disclosure.

FIG. 7 is a flowchart illustrating another method for the pass-through of audio signals to a wearable audio device in accordance with aspect(s) of this disclosure. The example method of FIG. 7 may be operable by a wearable audio device 100, or component(s) thereof, for the pass-through or rejection of local and/or remote environmental audio signals to a user in accordance with aspect(s) of this disclosure. For example, the steps of method 700 illustrated in FIG. 7 may be performed by a processor 120 of the wearable audio device 100.

The method 700 begins at block 701. At block 705, the processor 120 detects a first audio signal from an ambient audio signal. The detection of the first audio signal may be similar to the processes described in connection with block 405 of FIG. 4, discussed above. At block 710, the processor 120 calculates a direction from the wearable audio device 100 to a source of the first audio signal. At block 715, the processor 120 isolates the first audio signal from the ambient audio signal and passes the first audio signal through to the user via the speaker(s) 110. At block 720, the processor 120 determines whether the user has adjusted the position of his/her head toward the direction of the source. For example, the user may have his/her head positioned toward a first direction 505 (see, e.g., FIG. 5) and may adjust the position of his/her head toward the second direction 510 (e.g., toward the local source 205).

If the user has not adjusted the position of his/her head toward the source within a threshold time period, the method 700 continues at block 730. When the user adjusts the position of his/her head toward the source, the method 700 continues at block 725, where the processor 120 determines whether the user has adjusted the position of his/her head away from the source. While the user maintains the position of his/her hear toward the source, the playback of the first audio signal continues. Once the processor 120 detects that the user has adjusted the position of his/her head away from the source, the method continues at block 730, where the processor 120 ends the pass-through of the first audio signal to the user via the speaker(s) 730. The method 700 ends at block 735.

The method 700 of FIG. 7 may enable the user to hold a conversation with another person without removing the wearable audio device 100 and while only passing through the person's voice to the user (e.g., other ambient audio may be attenuated). For example, the wearable audio device 100 may pass-through the person's voice in response to the voice meeting the metric, and while the user maintains the position of his/her head in the direction of the person, the user can hold a conversation with the person. The wearable audio device 100 may attenuate further audio signals originating from the other person in response to the user adjusting the position of his/her head away from the other person.

Figure 8:
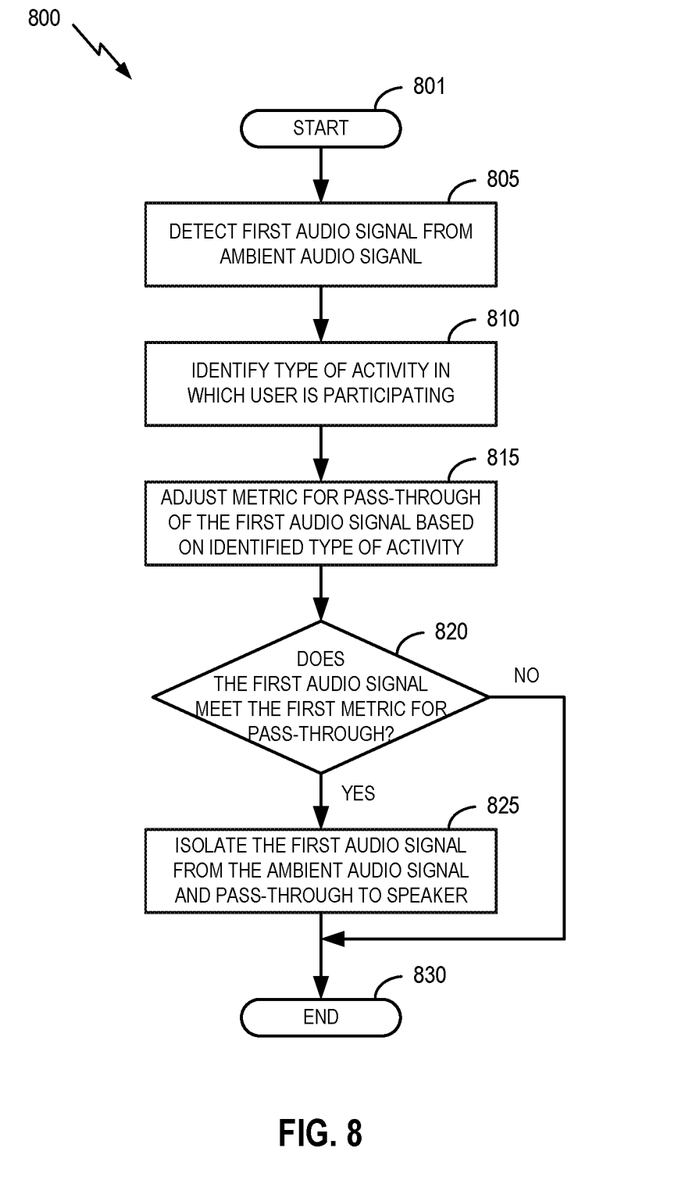
FIG. 8 is a flowchart illustrating yet another example method for the pass-through of audio signals to a wearable audio device in accordance with aspect(s) of this disclosure.

FIG. 8 is a flowchart illustrating yet another method for the pass-through of audio signals to a wearable audio device in accordance with aspect(s) of this disclosure. The example method of FIG. 8 may be operable by a wearable audio device 100, or component(s) thereof, for the pass-through or rejection of local and/or remote environmental audio signals to a user in accordance with aspect(s) of this disclosure. For example, the steps of method 800 illustrated in FIG. 8 may be performed by a processor 120 of the wearable audio device 100.

The method 800 begins at block 801. At block 805, the processor 120 detects a first audio signal from an ambient audio signal. The detection of the first audio signal may be similar to the processes described in connection with block 405 of FIG. 4, discussed above. At block 810, the processor 120 determines a type of activity in which the user is participating. The processor 120 may determine the type of activity based on output from one or more of the motion sensor(s) 160 and the additional sensor(s) 165. For example, the output from the motion sensor(s) 160 may be indicative of the user performing an activity, such as running or walking. The additional sensor(s) 165 may also provide data which may also be used by the processor 120 determine a type of the activity.

For example, when the wearable audio device 100 includes a heart rate monitor, the user's heart rate may be indicative of the user participating in an exercise. The processor 120 may receive a sensor signal from the heart rate monitor that is indicative of the user performing an exercise and may increase a threshold for meeting a metric for pass-through in response to the receiving the sensor signal indicative of the user performing the exercise from the heart rate monitor. The heart rate monitor may only send the sensor signal to the processor 120 in response to the heart rate of the user being greater than a heart rate threshold.

The processor 120 may also receive an indication of the type of the exercise from a client device 170. For example, a biometric monitoring device may be configured to monitor the user's movements and/or other biometrics of the user and identify, based on the measured biometric, the type of activity in which the user is participating. The biometric monitoring device and/or a client device 170 may also use geo-location data to identify the type of activity in which the user is participating. In other implementations, the user may also input a selection/command indicative of the type of activity in which the user is participating.

At block 815, the processor 120 adjusts a metric for pass-through of the first audio signal based on the identified type of the activity. The technique for adjusting the metric may depend on the source of the first audio signal in addition to the type of the activity. For example, the type of the activity may be a type of physical activity where the user may not wish to hold a conversation with another person. Thus, the processor 120 may increase the threshold for a metric for pass-through associated with voice audio signals such that these signals are less likely to be passed-through to the user. Additionally, when the user is performing an exercise activity outdoors, for example, in a city, the processor 120 may lower the threshold for a metric for pass-through associated with traffic audio signals (e.g., bicycle bells, car engine noise, car horns, sirens, etc.) to alert the user of potentially dangerous situations. In contrast, if the identified activity is that the user is working in an office or at home, the processor 120 may increase the threshold for a metric for pass-through associated with traffic audio signals (e.g., bicycle bells, car engine noise, car horns, sirens, etc.) to allow the user to concentrate.

In certain implementations, the processor 120 may select the metric for pass-through based on the geo-location data. The processor 120 may determine a location of the user based on geo-location data and select the metric based on the determined location. For example, the user may have an associated profile/database including a number of locations that the user typically visits, e.g., a gym, work, home, etc., and the processor 120 may select a metric based on the user being at one of the locations in the database. For example, certain audio signals may be more desirable to be passed-through to the user during a commute (e.g., traffic audio signals) than when the user is at home or work.

The processor 120 may also record the first audio signal for playback to the user after the user have completed the activity. For example, the processor 120 may identify the type of the activity as a breathing exercise. Since playback of an ambient audio signal may be disruptive to the breathing exercise, the processor 120 may record and store the first audio signal in the memory 130. Once the processor 120 has determined that the breathing exercise has been completed, the processor 120 may alert the user to the presence of the audio signal in the memory 130 for playback. Alternatively, the processor 120 may automatically playback the first audio signal without waiting for user input. Additionally, during a breathing exercise, it may be uncomfortable for a user to play the recorded first audio signal at a regular volume level (e.g., a volume that the first audio signal would be played at when the user is not performing a breathing exercise). Thus, the processor 120 may gradually increase the volume of the first audio signal during playback after the completion of the breathing exercise.

As another example, the identified type of activity may be associated with a personal trainer. For example, the user may regularly perform an exercise with a personal trainer who gives the user audible instructions to follow during the exercise. Accordingly, it may be desirable for the user to hear only the personal trainer's voice, while blocking out other sounds that may be distracting to the user. As such, in response to determining that the exercise is associated with a personal trainer, the processor 120 may identify the personal trainer's voice as the first audio signal and adjust the metric for pass-through such that the personal trainer's voice is passed-through to the user via the speaker 110 while the user is participating in the activity. At block 820, the processor 120 determines whether the first audio signal meets the first metric for pass-through to the user. If the first audio signal meets the first metric, then the method 800 proceeds to block 825, where the processor 120 isolates the first audio signal from the ambient audio signal and passes through the isolated first audio signal to the speaker 110 for playback to the user. If the first audio signal does not meet the first metric, then the method 800 proceeds to block 830. The method 800 ends at block 830.

Example Flowchart for Audio Signal Pass-Through by Wearable Audio Device

Figure 9:
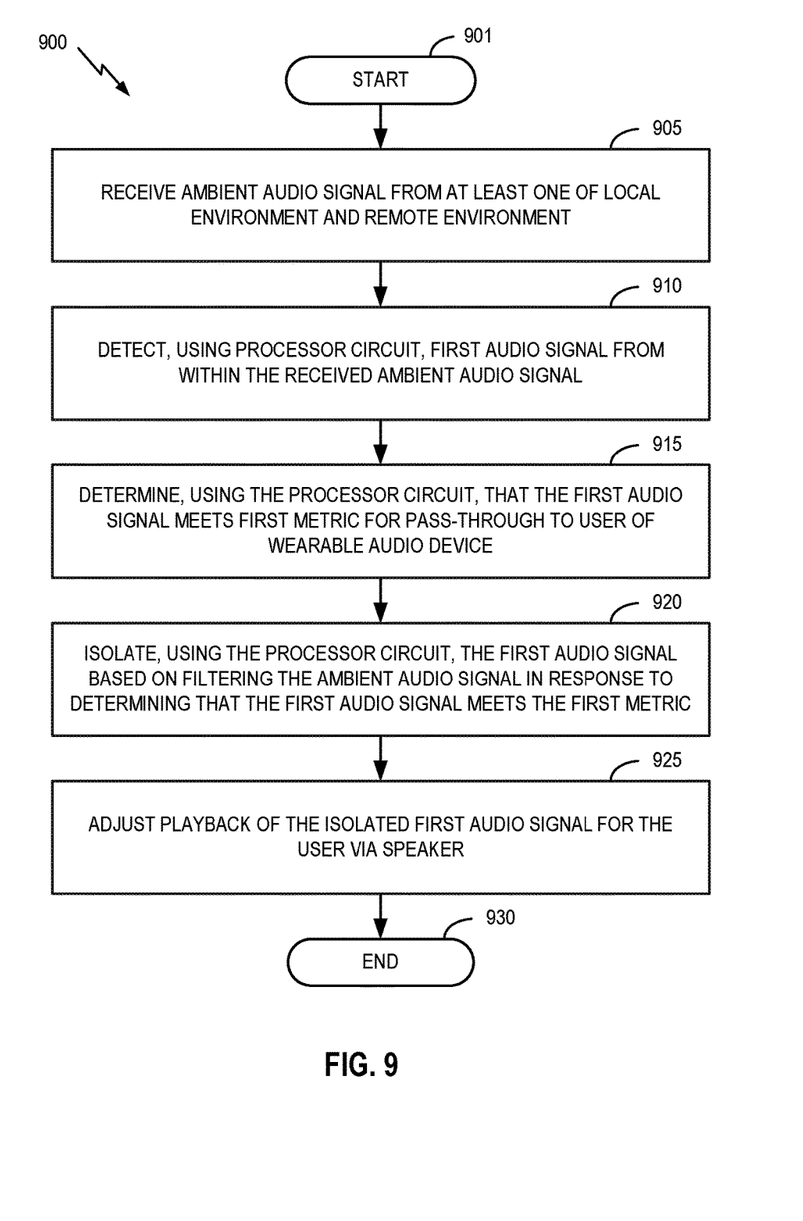
FIG. 9 is a flowchart illustrating an example method for critical audio pass-through in accordance with aspect(s) of this disclosure.

FIG. 9 is a flowchart illustrating an example method operable by a wearable audio device 100, or component(s) thereof, for critical audio pass-through in accordance with aspect(s) of this disclosure. For example, the steps of method 900 illustrated in FIG. 9 may be performed by a processor 120 of the wearable audio device 100. In another example, a client device 170, a server 175, or a remote source 205 in communication with the wearable audio device 100 may perform at least some of the steps of the method 900. For convenience, the method 900 is described as performed by the processor 120 of the wearable audio device 100.

In one implementation, the wearable audio device 100 comprises a speaker 110 configured to provide audio signals to a user and a processor (also referred to as a processing circuit) 120. The method 900 begins at block 901. At block 905, the processor 120 receives an ambient audio signal from at least one of a local environment and a remote environment. At block 910, the processor 120 detects a first audio signal from within the received ambient audio signal. At block 915, the processor 120 determines that the first audio signal meets a first metric for pass-through to a user of the wearable audio device, the first metric indicative of a first priority level of the first audio signal to the user. At block 920, the processor 120 isolates the first audio signal based on filtering the ambient audio signal in response to determining that the first audio signal meets the first metric. At block 925, the processor 120 adjusts playback of the isolated first audio signal for the user via the speaker. The method 900 ends at block 930.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices, such as, for example, wearable devices, wireless communication device handsets, or integrated circuit devices for wearable devices, wireless communication device handsets, and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Processor(s) in communication with (e.g., operating in collaboration with) the computer-readable medium (e.g., memory or other data storage device) may execute instructions of the program code, and may include one or more processors, such as one or more digital signal processors (DSPs), general purpose microprocessors, ASICs, field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. Also, the techniques could be fully implemented in one or more circuits or logic elements.

The techniques of this disclosure may be implemented in a wide variety of devices or apparatuses, including a wearable device, a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method operable by a wearable audio device, the wearable audio device comprising a speaker and a processor circuit, the method comprising:
   receiving an ambient audio signal from at least one of a local environment and a remote environment;
   detecting, using the processor circuit, a first audio signal from within the received ambient audio signal;
   determining that the first audio signal corresponds to a type of audio source from a plurality of types of audio sources;
   determining, using the processor circuit, that the first audio signal meets a first metric for pass-through to a user of the wearable audio device, the first metric associated at least in part with the type of audio source corresponding to the first audio signal;
   isolating, using the processor circuit, the first audio signal based on filtering the ambient audio signal in response to determining that the first audio signal meets the first metric;
   adjusting playback of the isolated first audio signal for the user via the speaker;
   determining, using a motion sensor, a manner in which the user has moved in response to the first audio signal being played via the speaker; and
   adjusting a level of the first metric associated with the type of audio source in response to determining that the user has reacted to the first audio signal.

2. The method of claim 1, further comprising: calculating a direction from the wearable audio device to a source of the first audio signal, wherein determining the manner in which the user has moved in response to the first audio signal being played via the speaker comprises detecting that the user has adjusted the position of the user's head toward a direction of the source of the first audio signal.

3. The method of claim 2, wherein adjusting playback of the isolated first audio signal comprises generating a three-dimensional (3-D) audio effect that the played first audio signal is emanating from a point in a 3-D space corresponding to the source of the first audio signal.

4. The method of claim 1, wherein determining the manner in which the user has moved in response to the first audio signal being played via the speaker comprises detecting that the user has adjusted the position of the user's head by greater than a threshold movement value.

5. The method of claim 1, further comprising:
   determining that the first audio signal fails to meet the first metric;
   determining that the first audio signal meets a second metric for pass-through to the user of the wearable audio device, the second metric indicative of a second priority level of the first audio signal to the user, the second priority level being lower than the first priority level;
   prompting the user to accept or reject playback of the first audio signal; and
   playing the first audio signal via the speaker in response to receiving user feedback indicative of the user accepting playback of the first audio signal.

6. The method of claim 5, wherein:
   the wearable audio device further comprises a motion sensor, and
   the user feedback is detected based on output of the motion sensor.

7. The method of claim 5, wherein the user feedback is received via at least one of: a button, a client device, a microphone, a motion sensor, and a pressure sensor.

8. The method of claim 1, further comprising:
   identifying a source of the first audio signal; and
   adjusting the first metric based on the identified source.

9. The method of claim 8, wherein the identified source of the first audio signal comprises a person other than the user, the method further comprising:
   calculating a direction from the wearable audio device to the identified source;
   detecting that the user has adjusted the position of the user's head toward a direction of the source of the first audio signal, wherein the playing of the first audio signal is performed in response to detecting that the user has adjusted the position of the user's head toward the direction of the source;
   detecting that the user has adjusted the position of the user's head away from the direction of the source; and
   ending the playing of the first audio signal in response to detecting that the user has adjusted the position of the user's head away from the direction of the source.

10. The method of claim 1, wherein the wearable audio device further comprises at least one geo-location sensor, the method further comprising:
    determining a location of the user based on output of the at least one geo-location sensor; and
    selecting the first metric based on the determined location of the user.

11. The method of claim 1, wherein the first audio signal meets the first metric when a source of the first audio signal is identified as at least one of: a siren, a bicycle bell, a vehicle horn, a person's voice registered with the wearable audio device, a voice having a volume above a threshold level, and a voice saying the user's name.

12. The method of claim 1, wherein determining that the first audio signal meets the first metric comprises determining that a source of the first audio signal is within a threshold distance from the user.

13. The method of claim 1, further comprising:
    detecting, using the processor circuit, a second audio signal from within the received ambient audio signal; and determining that the second audio signal does not meet the first metric,
wherein filtering the ambient audio signal comprising filtering the second audio signal out of the ambient audio signal.

14. A wearable audio device, comprising:
a speaker;
a microphone;
a processor circuit; and
a memory having stored thereon instruction that, when executed, cause the processor to:
  receive, from the microphone, an ambient audio signal;
  detect a first audio signal from within the received ambient audio signal;
  determine that the first audio signal corresponds to a type of audio source from a plurality of types of audio sources;
  determine that the first audio signal meets a first metric for pass-through to a user of the wearable audio device, the first metric associated at least in part with the type of audio source corresponding to the first audio signal;
  filter the ambient audio signal to isolate the first audio signal in response to determining that the audio signal meets the first metric;
  play the isolated first audio signal via the speaker;
  determine, using a motion sensor, a manner in which the user has moved in response to the first audio signal being played via the speaker; and
  adjust a level of the first metric associated with the type of audio source in response to determining that the user has reacted to the first audio signal.

15. The wearable audio device of claim 14, wherein the memory further has stored thereon instructions that, when executed, cause the processor to:
  calculate a direction from the wearable audio device to a source of the first audio signal;
  detect that the user has adjusted the position of the user's head toward a direction of the source of the first audio signal; and
  adjust a level of the first metric in response to detecting that the user has adjusted the position of the user's head.

16. The wearable audio device of claim 14, wherein the memory further has stored thereon instructions that, when executed, cause the processor to:
  determine that the first audio signal fails to meet the first metric;
  determine that the first audio signal meets a second metric for pass-through to the user of the wearable audio device, the second metric indicative of a second priority level of the first audio signal to the user, the second priority level being lower than the first priority level;
  prompt the user to accept or reject playback of the first audio signal; and
  play the first audio signal via the speaker in response to receiving user feedback indicative of the user accepting playback of the first audio signal.

17. A wearable audio device, comprising:
at least one speaker;
a microphone;
a motion sensor;
a processor circuit; and
a memory having stored thereon instruction that, when executed, cause the processor to:
  receive, from the microphone, an ambient audio signal;
  detect an audio signal from within the received ambient audio signal;
  determine that the first audio signal corresponds to a type of audio source from a plurality of types of audio sources;
  determine, using the processor circuit, that the first audio signal meets a first metric for pass-through to a user of the wearable audio device, the first metric associated at least in part with the type of audio source corresponding to the first audio signal;
  calculate a direction from the wearable audio device to a source of the audio signal;
  detect, based on output from the motion sensor, that the user has adjusted positioning of the user's head toward the direction of the source of the audio signal;
  filter the ambient audio signal to isolate the audio signal in response to detecting that the user has adjusted the positioning of the user's head toward the direction of the source and that the first audio signal has met the first metric associated at least in part with the type of audio source corresponding to the first audio signal;
  adjust a level of the first metric associated with the type of audio source in response to determining that the user has adjusted the positioning of the user's head; and
  play the isolated audio signal via the speaker.

18. The wearable audio device of claim 17, wherein the type of audio source of the audio signal is a person registered with the wearable audio device.

19. The wearable audio device of claim 17, wherein the memory further has stored thereon instructions that, when executed, cause the processor to:
  identify, within the audio signal, a voice saying the user's name,
  wherein playing the isolated audio signal via the speaker is in response to identifying the voice saying the user's name.

* * * * *